United States Patent
Kleppner

[15] 3,691,381
[45] Sept. 12, 1972

[54] LOW ENERGY SUPERCONDUCTING PARTICLE COUNTER

[72] Inventor: Daniel Kleppner, Belmont, Mass.

[73] Assignee: Massachusetts Institute of Technology, Cambridge, Mass.

[22] Filed: March 19, 1970

[21] Appl. No.: 20,977

[52] U.S. Cl..........250/83.3 R, 250/83.3 H, 307/306
[51] Int. Cl..............................................G01t 1/16
[58] Field of Search.....250/83.3 R, 83.3 H; 307/306, 307/307

[56] References Cited

UNITED STATES PATENTS

| | | |
|---|---|---|
| 3,533,018 | 10/1970 | Jaklevic et al. ........307/306 X |
| 2,975,286 | 3/1961 | Rappaport et al. ...250/83.3 R |
| 3,070,698 | 12/1962 | Bloembergen........250/83.3 H |

*Primary Examiner*—Archie R. Borchelt
*Attorney*—Thomas Cooch, Martin M. Santa and Lawrence Gilbert

[57] ABSTRACT

Apparatus having a superconductive thin film triggered by an energy pulse detects and counts the incidence of radiant energy upon the film. The film or a portion of the film is driven normal by means of a regenerative process initiated by the temperature rise caused by the energy pulse. A sensing circuit detects the presence of the energy pulse, and then resets the film to its superconductive state.

7 Claims, 8 Drawing Figures

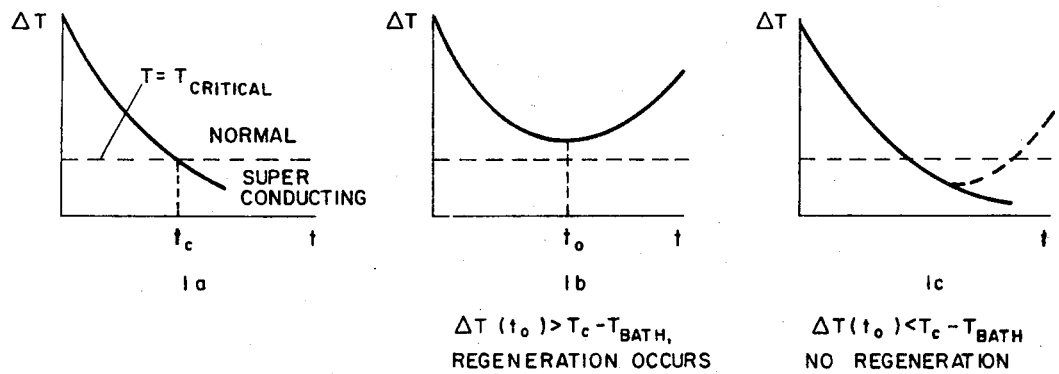
$\Delta T(t_o) > T_c - T_{BATH}$,
REGENERATION OCCURS
$\Delta T(t_o) < T_c - T_{BATH}$
NO REGENERATION
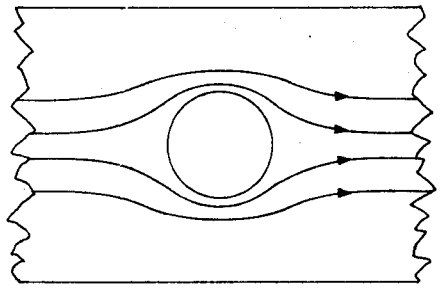
FIG. 2

LOW ENERGY SUPERCONDUCTING PARTICLE COUNTER

The invention herein described was made in the course of work performed under a contract with the Office of the Secretary of Defense, Advanced Research Projects Agency.

BACKGROUND OF THE INVENTION

1. Field

This invention relates to the field of radiant energy detectors which employ superconducting thin films.

2. Descriptions of the Prior Art

Thin film superconducting bolometers have been successfully employed as efficient radiant energy detectors. A bolometer detects the average power incident upon the film which is absorbed in the film giving rise to a change in temperature. By operating a current through the film in the transition area, the change in temperature causes a change in resistance which provides a measurement of the average incident power on the film.

A superconducting nuclear particle detector has been described by N. K. Sherman, Phys. Rev. 8, 438 (1962). Sherman proposes a superconductive thin film detector capable of counting high energy nuclear particles. Should a particle of sufficient energy pass through the film, the film will become normal causing a voltage pulse to appear across a resistor in series with the film. Such a detector will count only those particles of sufficient energy to cause the film to go normal without the benefit of regeneration.

SUMMARY

In accordance with this invention, a radiant energy detector is triggered by a pulse of low energy generated by an incident particle. The detector is a bistable device consisting of a superconducting thin film in thermal contact with an insulating substrate. The operating temperature of the detector is just below the transition temperature so that the device is entirely off until such time as an incident particle generates sufficient internal gain in heat in the film to cause regeneration which results in the detector switching from the superconductive to the normal state. A sensing circuit detects the presence of the energy pulse and resets the film by turning off the circuit for a time sufficient for the film to cool to its superconductive state.

It is an object of the present invention to provide a radiant energy detector capable of detecting at high rates the presence of incident particles.

It is a further object to count the incident particles.

It is a feature of this invention that the energy can be discriminated by sweeping the bias current.

DRAWING

FIG. 1a is a graph showing the temperature of the hot spot vs time in the case of no bias current present. With negligible energy contribution from Joule heating, at time $t_c$, the temperature falls below the critical value, $T_{critical}$, and the normal volume reverts to the superconducting state.

FIG. 1b is a graph showing the temperature of the hot spot vs time with bias current present. In this case $\Delta T(T_o) > T_c - T(\text{bath})$, and regeneration occurs.

FIG. 1c is a graph showing the temperature of the hot spot vs time with bias current present. In this case $\Delta T(T_o) < T_c - T$ (bath), and the film reverts to the superconducting state before regeneration can occur.

FIG. 2 shows the bias current detouring around a hot spot or disc driven normal.

Figure 5A:
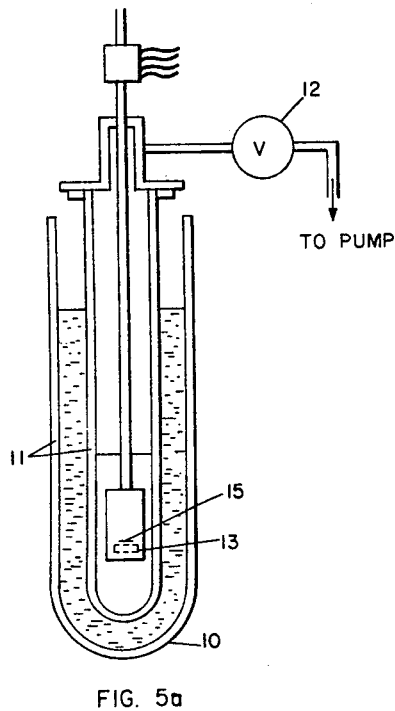

FIG. 5a presents the apparatus used to make the film superconductive.

Figure 5B:
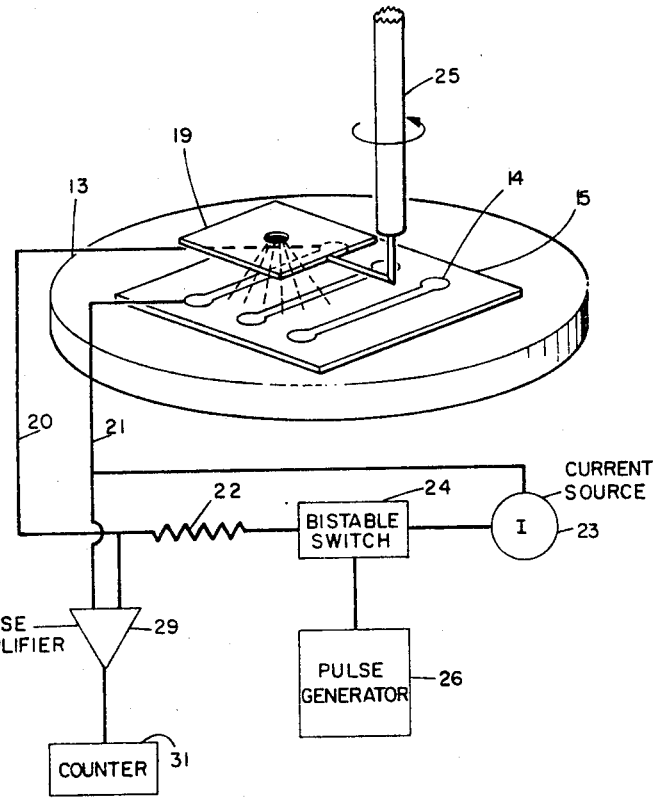

FIG. 5b shows the circuit used to count incident particles projected onto the film.

DESCRIPTION OF THE PREFERRED EMBODIMENT

The radiant energy detector consists of a superconducting thin tin film in thermal contact with a sapphire substrate. The film is cryogenically cooled to the temperature of liquid helium. A bias current whose operating point is just below the critical current is passed through the length of the film. When an incident particle transfers sufficient energy to induce regeneration causing the entire film or a portion of the film to go normal, an IR drop across the film is developed and monitored by a voltage amplifier. The output pulse of the voltage amplifier triggers a pulse generator which interrupts the bias current for a time sufficient for the film to revert to its superconductive state, and also pulses a counter thereby recording the event. Since the film has a thermal relaxation time of less than 50 nanoseconds, the detector is capable of very high counting rates.

When an incident particle strikes a point on the surface of the film, energy is released at the point of impact forming a hot spot. If the particle releases enough energy, the hot spot is driven normal. A normal region or volume as used in this specification refers to that region or volume above the critical temperature, $T_c$, where the film changes from the superconducting state having essentially zero resistance to a state having normal resistance to the flow of current. From this initial point or hot spot, heat spreads radially by diffusion. If no regeneration takes place, the temperature will fall as shown in FIG. 1a. Here the instantaneous temperature deviation $\Delta T = T - T(\text{bath})$, is shown as a function of time. At time $t_c$, the temperature falls below the critical value, $T_{critical}$, and the normal volume reverts to the superconducting state. When a bias current is present, the situation shown in FIG. 1b can occur. The initial heat pulse diffuses radially outward and the temperature starts to fall. But if Joule heating caused by persistent flow of the bias current through the normal region is sufficient, the temperature will start to rise. The temperature stops falling at time $t_o$. If $T(t_o) > T_c - T(\text{bath})$, regeneration will occur and the hot spot will grow.

The phenomenon of regeneration may be explained as follows. If a portion of the film is driven normal by an incident particle due to the initial local temperature rise, the bias current will detour around the hot spot or disc as shown in FIG. 2. As the radius of the disc grows with time, the bias current is forced to change direction thereby dissipating energy. Due to the changing current a voltage is induced across the disc, the effect of which is to cause a power dissipation through the disc. The inductive effect will maintain the current to flow through the normal region with a power dissipation given by $$P = \int_{V_n} \sigma E^2 dv = \int_{V_n} \frac{J_o^2}{\sigma} dV = \frac{1}{d} J_o^2 a^2$$

where:
  $V_n$ is the volume of the normal region
  $E$ is the energy introduced by the particle
  $J_o$ is the volume of current density
  $\sigma$ is the normal conductivity of the material
  $d$ is the thickness of the film
  $j_o$ is the applied surface current density
  $a$ is the radius of the hot spot or disc This, in turn, produces Joule heating which, added to the original energy pulse, maintains the spreading hot spot normal. Thus, a regenerative process occurs which enlarges the volume of the normal region or disc causing a further dissipation of energy. The process continues until the entire film is driven normal, or until the bias current is turned off.

Alternatively, if the situation is as shown in FIG. 1c with $T(t_o)<T_c-T(\text{bath})$, the temperature will continue to fall since the film will revert to the superconducting state before regeneration can occur.

Figure 3:
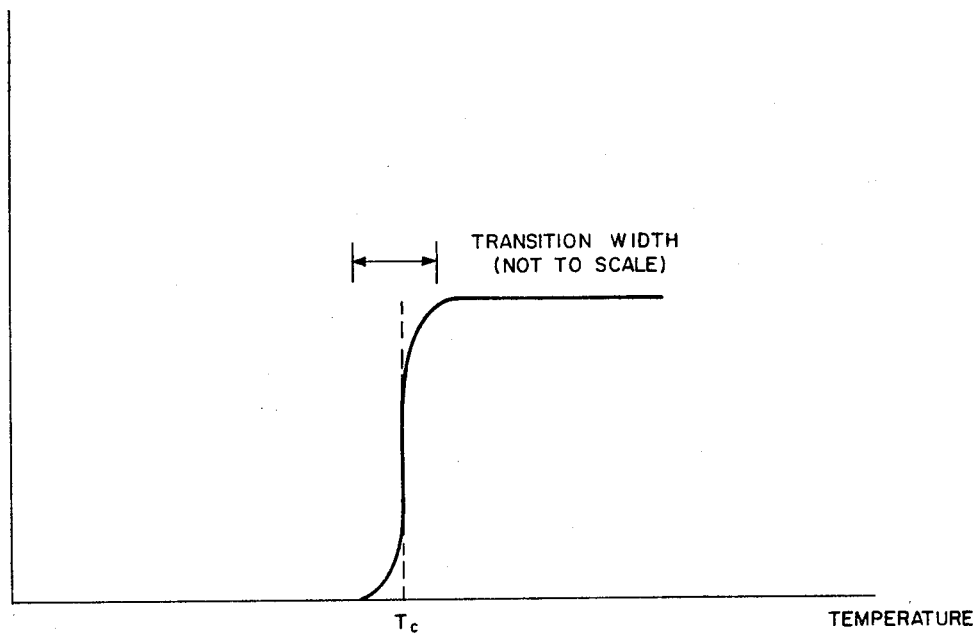
FIG. 3 is a graph illustrating the region of transition width of the film.

The transition width of the film as used herein refers to that temperature range about the critical temperature $T_c$. The region of transition width is illustrated in FIG 3. The width of the region is important since the sensitivity of the detector depends on the energy required to drive the minimum volume normal which in turn depends on the width of the transition region. As the width of the transition region decreases, the sensitivity of the detector increases. Decreasing the width of the film also increases the current density although at a sacrifice in incident area. It is important that the current density be high to obtain maximum heat to effect regeneration.

The energy required to drive the minimum normal volume can also be decreased by decreasing the thickness of the film. The temperature rise caused by the energy pulse is inversely proportional to at least the square of the thickness, and possibly the cube. However, the transition region broadens as the strip of film is made thinner. Hence, a compromise must be reached between the competing effects. For a film approximately 1,000A thick the transition width is typically 15 millidegrees. Quite likely the optimum thickness is between 100A and 1,000A.

Figure 4:
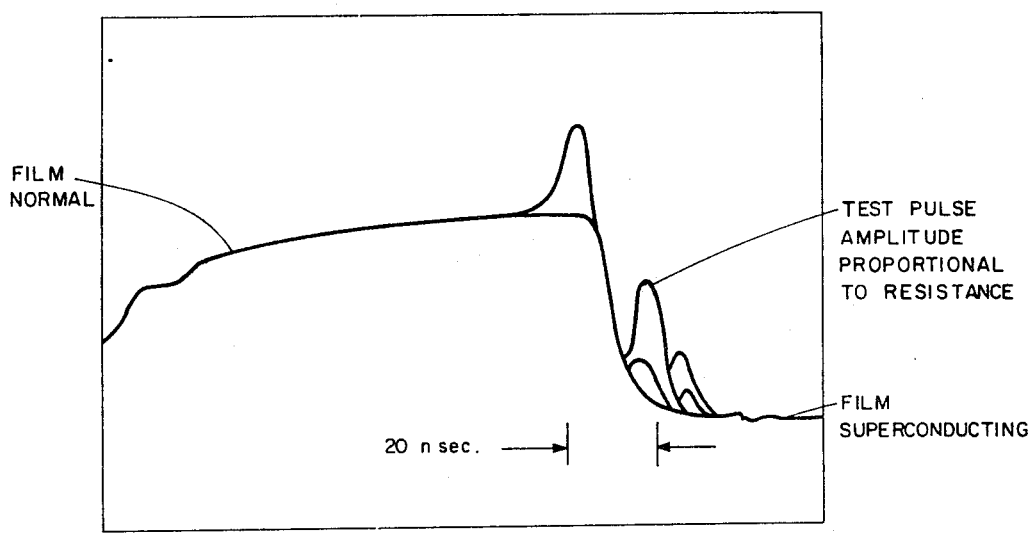
FIG. 4 is a graph of a typical measurement of the thermal relaxation time of the film.

The thermal relaxation time of the film was determined to be less than 50 nanoseconds by employing the following double current pulse method. A first pulse delivers enough current to drive the film completely normal. This is followed by a sensing pulse that can be variably delayed with respect to the first pulse and is such that it gives a detectable signal, when the film is normal, without appreciatively disturbing the state of the film. The trace of a multiple exposure photograph shown in FIG. 4 is a typical measurement. The horizontal scale of the photo is 20 nanosecond/centimeter thereby indicating a thermal relaxation time of less than 50 nanoseconds for the film.

EXAMPLE

Referring to FIGS. 5a and 5b, the apparatus 10 consists of standard glass helium dewars 11 with pressure control 12 and electronic temperature regulation 13. Tin (Sn) films 14 are vacuum deposited to sapphire substrates 15 approximately one-sixteenth inch thick. The film is evaporated in an evaporator using standard procedures and a conventional mask to define the film. The background pressure in the evaporator is typically $3\times10^-$mm/Hg with the pressure rising to about $5\times10^{-6}$ mm during deposition. The dimensions of the films are 1 cm long $\times$ 300 $\mu$ wide $\times$ 1,000A thick. The film is trimmed with a diamond tool to a width of about 50 microns, placed in the apparatus 10, and cooled to the temperature of liquid helium. The electrical resistance of the normal film at liquid helium temperature is typically 20 ohms. The measured transition width is typically 60 millidegrees when the measuring current is 0.5 milliamperes. The resistance and transition width are typically 55 ohms and 15 millidegrees, respectively after the film is mechanically trimmed. Trimming the film provides an edge having a rectangular cross section which reduces the transition width.

A high energy alpha particle source generator, an Americium[241] source 19, is located 1 cm above the strip of film 14. A sensing circuit having leads 20 and 21 is soldered or clipped to each end of the length of film. Completing the sensing circuit is load resistor 22, current source 23, and bistable switch 24 normally set to the closed position. Pulse generator 26 having a frequency of 10KHz is serially connected to the bistable switch, and periodically opens it for 1 $\mu$ sec at an interval of 100 $\mu$ sec. Pulse amplifier 29 is connected to leads 20 and 21 which puts it in parallel with the sensing circuit. Counter 31 is connected to the output of the pulse amplifier.

The Americium[241] source directs alpha particles onto the film. The bias current is increased until the film switches states and then is backed off just below the transition region. When an incident particle transfers its energy to the film, a hot spot forms at the point of contact. If the incident alpha particle drives a portion of the film normal, the temperature rise caused by the energy pulse will be sustained by the inductive effects described above. In this manner, heat is regenerated in the small normal spot in the film to maintain the bias current through the normal spot. The process continues until the entire film is driven normal. The presence of any IR drop across the film is monitored by the pulse amplifier and amplified to a level suitable for triggering the counter. The pulse generator automatically interrupts the current which resets the film to its superconducting condition. Shaft 25 of source 19 is rotated by hand to move and turn off the source.

Due to the very fast thermal relaxation time of less than 50 nanoseconds, the film can revert to its superconductive state in a much shorter time than the 1 microsecond used in the present configuration. In this manner, the film acts as a very fast superconductive detector triggered by the energy pulse.

By sweeping the bias current, the magnitude of the energy pulses detected can be discriminated.

Another means for detecting the energy dissipated through the film is accomplished by using the persistent current in a superconducting loop which includes the detector as part of the circuit. The total energy available, the magnetic energy stored inductively in the loop, could be completely dissipated by heating only a small portion of the detector. The event would be detected by noting the collapse of flux in the loop. This would have advantages of higher speed, and of not heating the entire film every time a particle is counted.

Although the invention has been described and illustrated in detail, it is to be clearly understood that the same is by way of illustration and example only and is not to be taken by way of limitation, the spirit and scope of this invention being limited only by the terms of the appended claims.

In particular, a pulse generator having a pulse length smaller than 1 microsecond but greater than 50 nanoseconds could have been used so as to increase the counting rate. Clearly, an analog output could be substituted for the counter. Also, infrared photons could be used as the source generator. Although the invention uses tin films deposited on a sapphire substrate, it should be understood that the invention is applicable to any materials which have similar thermal properties such as granite and sapphire or quartz and glass. Also, it is unnecessary for the entire film to be driven normal. It is necessary for only a portion of the film sufficient to dissipate a detectable amount of energy to be driven normal to detect the presence of an incident particle.

What is claimed is:

1. A low energy superconductive particle counter for use with a source of elementary particles comprising:
   a. a superconductive thin film;
   b. a substrate supporting said film;
   c. means for cooling said film to its superconductive state;
   d. means for passing a bias current through said film; said bias current producing an operating temperature in said film just below the transition temperature of said film;
   e. means for detecting a voltage across said film when said film changes from a superconducting to a normal state, said film being capable of changing its state in response to radiation particles incident thereon;
   f. pulse generating means adapted to interrupt said bias current for a time sufficient for said film to revert to said superconductive state; and
   g. counting means responsive to said detecting means, thereby counting the number of particles incident upon said film.

2. Apparatus, as recited in claim 1, wherein said superconductive thin film is tin.

3. Apparatus, as recited in claim 1, wherein said substrate is sapphire.

4. Apparatus, as recited in claim 1, wherein said means for passing a bias current through said film comprises a sensing circuit having first and second leads connected to the ends of said film which includes;
   a. a load resistor connected to said first lead;
   b. a normally closed bistable switch serially connected to said load resistor; and
   c. a current source serially connected to said bistable switch and to said second lead.

5. Apparatus, as recited in claim 4, wherein said means for detecting the energy dissipated through said film comprises a voltage amplifier connected in parallel with said sensing circuit, said voltage amplifier detecting an IR drop across said film, said IR drop being caused by an incident particle from said source that generates sufficient internal gain in heat in said film to cause regeneration whereby said film is switched from said superconductive state to the normal state.

6. Apparatus, as recited in claim 4, wherein said pulse generating means comprises a pulse generator serially connected to said bistable switch to interrupt said bias current for a time sufficient for said film to revert to said superconductive state.

7. Apparatus, as recited in claim 5, wherein said counting means comprises a counter connected to the output of said voltage amplifier to count the number of particles incident upon said film.

* * * * *